Figure 1:
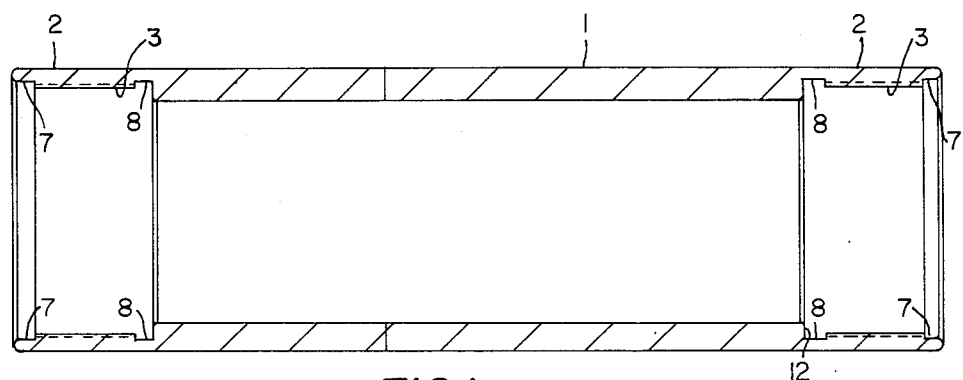

United States Patent [19]

Kip et al.

[11] Patent Number: 4,773,149
[45] Date of Patent: Sep. 27, 1988

[54] METHOD OF MAKING CERAMIC TUBE FOR HIGH TEMPERATURE USE

[75] Inventors: Guenther W. Kip; Kenneth J. Taylor, both of Redwood City, Calif.

[73] Assignee: GTE Products Corporation, Stamford, Conn.

[21] Appl. No.: 95,731

[22] Filed: Sep. 14, 1987

[51] Int. Cl.<sup>4</sup> ............... B21D 39/03; B23P 11/00
[52] U.S. Cl. ................... 29/428; 29/527.1; 29/558; 138/155; 264/67; 285/390; 285/911
[58] Field of Search ............ 29/527.1, 428, 558; 138/155; 264/56, 67; 285/390, 355, 911

[56] References Cited

U.S. PATENT DOCUMENTS

| 300,957 | 6/1884 | Courtney | 138/155 X |
|---|---|---|---|
| 643,685 | 2/1900 | Saunders | 138/155 X |
| 1,529,719 | 3/1925 | Romeyn | 138/155 X |
| 1,613,461 | 1/1927 | Johnson | 138/155 X |
| 2,546,337 | 3/1951 | Gibson | 138/155 X |
| 2,614,585 | 10/1952 | Wagstaff | 138/155 X |
| 2,795,844 | 6/1957 | Liszak | 29/157 R X |
| 3,692,338 | 9/1972 | Nick | 285/911 X |
| 3,725,186 | 4/1973 | Lynch | 264/67 UX |
| 4,259,993 | 4/1981 | Scholz | 138/155 X |
| 4,732,796 | 3/1988 | Schalschneider | 138/155 X |

FOREIGN PATENT DOCUMENTS 717128 10/1954 United Kingdom ............... 138/155

Primary Examiner—Charlie T. Moon
Attorney, Agent, or Firm—James Theodosopoulos

[57] ABSTRACT

A long alumina ceramic tube having good linearity is made by longitudinally joining shorter sintered alumina tubes at the ends thereof. The end of one shorter tube is ground and externally threaded. The end of another shorter sintered alumina tube is ground and internally threaded. The externally threaded end is then securely threaded into the internally threaded end. Additional tubes are similarly ground and threaded to attain the length of the long alumina ceramic tube.

3 Claims, 1 Drawing Sheet

METHOD OF MAKING CERAMIC TUBE FOR HIGH TEMPERATURE USE

This invention concerns the manufacture of a ceramic tube for high temperature use. In some applications, it is required that the tube be quite lengthy and quite true in linearity. In one such application, where a copper vapor atmosphere is maintained within the tube at 1500° C., a particular tube is 9' long by 3" inside diameter. In the past, the tube was made by slip casting in one piece. Because of the 9' length, it was difficult to maintain the desired degree of linearity, especially where the slip cast ceramic composition had to be sintered at a high temperature. This invention discloses a method of making such a tube having improved linearity.

In this invention, the desired tube is made by first making shorter tubes having predetermined dimensions and then joining the ends of the shorter tubes to provide improved linearity. The reason for the use of the shorter tubes is that it is easier to maintain linearity in a shorter tube than it is in a longer tube. The ends of the tubes are made to thread inside each other.

Figure 2:
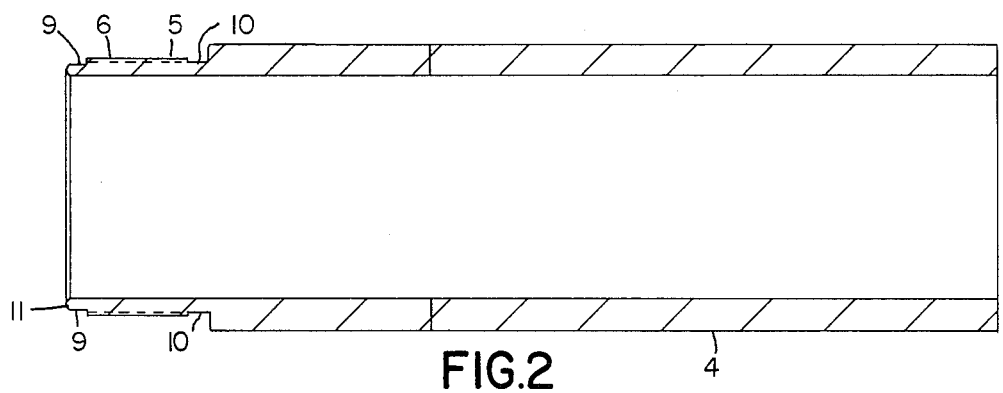

In the drawing,

FIG. 1 shows a tube internally threaded at each end.
FIG. 2 shows a tube externally threaded at one end.

In one example, alumina tubes, about three feet long, were made by isostatic pressing Al998C (99.8% $Al_2O_3$) alumina powder on a mandrel, removing the pressed tube, and then fully sintering at 1700° C. The diameter of the mandrel was carefully selected so that after sintering, which resulted in about 20% shrinkage, the sintered tube had the desired inside diameter of 3" and had, after outside machining, a wall thickness of about 220 mils. The tube was then cut to an accurate predetermined length.

The inside surface 3 at each end 2 of tube 1 was ground down for a length of about one inch to reduce the wall thickness about in half, as shown in FIG. 1. Then both ground surfaces 3 were accurately internally threaded, at 6 threads per inch, the thread depth being 35 mils. Threading was accomplished on a lathe using a diamond wheel shaped to the proper taper.

Outside surface 6 at one end 5 of tube 4 was ground down for a length of about one inch to reduce the wall thickness about in half, as shown in FIG. 2. Then ground surface 6 was accurately externally threaded, at 6 threads per inch, the thread depth being 35 mils, to mate with threaded ground surfaces 3.

Then a tube 4 was securely threaded into each end 2 of tube 1 to provide the desired nine foot long ceramic tube. Good linearity is obtained by this method because machining and threading of the three foot tubes is done after the tubes have been fully sintered at the high temperature of 1700° C., a sintering step during which distortion can occur.

At each outer terminus 7 and inner terminus 8 of each inside surface 3, inside surface 3 is not threaded but provides clearance for outside surface 6 when outside surface 6 is threaded into inside surface 3. The unthreaded length of inside surface 3, that is to say, the length of each of terminus 7 and terminus 8, was 150 mils.

Similarly, outer terminus 9 and inner terminus 10 of each outside surface 6 is unthreaded to provide clearance for inside surface 3. Similarly, the length of each of terminus 9 and terminus 10 was 150 mils. The reason for providing terminuses, or steps, 7, 8, 9, and 10 is to prevent chipping of the ceramic during threading and to permit tip surface 11 of tube 4 to make contact with landed surface, or face, 12 of tube 1 for complete sealing.

We claim:

1. The method of making an elongated alumina tube having a predetermined length comprising the steps of preparing a plurality of sintered alumina tubes each having a predetermined wall thickness and each having a length shorter than said predetermined length, grinding a short length of the outside surface at one end of one of said sintered alumina tubes to about half of said predetermined wall thickness, machining external threads onto said ground outside surface, grinding a short length of the inside surface at one end of a second of said sintered alumina tubes to about half of said predetermined wall thickness, machining internal threads onto said ground inside surface, securely threading the externally threaded end of the second alumina tube into the internally threaded end of the first alumina tube, and similarly grinding, machining and threading additional sintered alumina tubes to attain the predetermined length of said elongated alumina tube.

2. The method of claim 1 wherein the sintered alumina tubes are made by isostatic pressing 99.8% alumina powder on a mandrel, removing the Pressed tube, and then fully sintering the pressed tube at 1700° C.

3. The method of claim 1 including the step of providing clearance steps at the inner and outer terminuses of the ground outside surface and the ground inside surface in order to prevent chipping of the alumina when the second alumina tube is threaded into the first alumina tube.

* * * * *